O. W. COWGILL.
MACHINE FOR MAKING ENVELOPS.
APPLICATION FILED MAY 18, 1909.

1,218,597.

Patented Mar. 6, 1917.
12 SHEETS—SHEET 1.

Witnesses:

Inventor:
O. W. Cowgill.

O. W. COWGILL.
MACHINE FOR MAKING ENVELOPS.
APPLICATION FILED MAY 18, 1909.

1,218,597.

Patented Mar. 6, 1917.
12 SHEETS—SHEET 3.

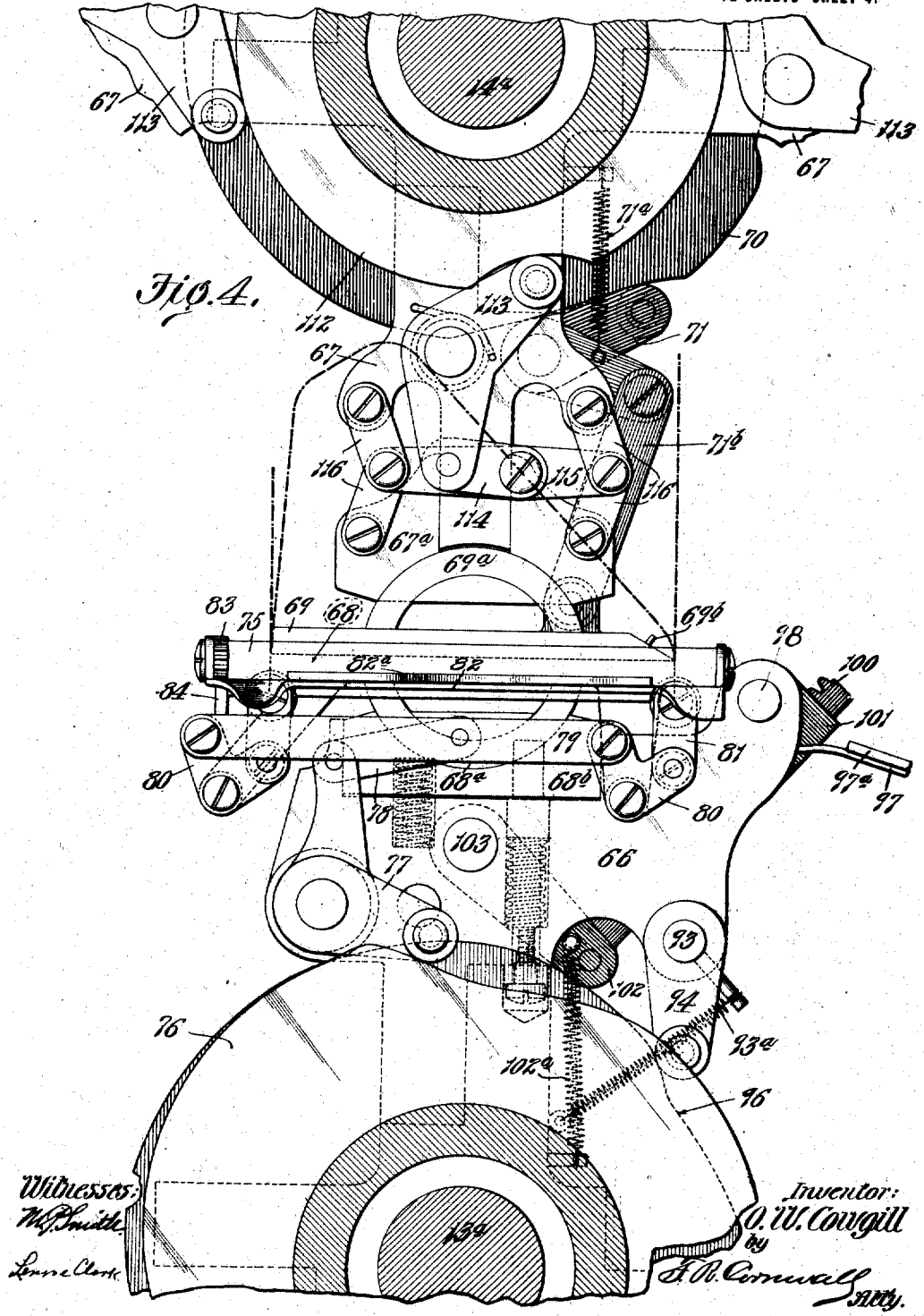

O. W. COWGILL.
MACHINE FOR MAKING ENVELOPS.
APPLICATION FILED MAY 18, 1909.
1,218,597.
Patented Mar. 6, 1917.
12 SHEETS—SHEET 5.
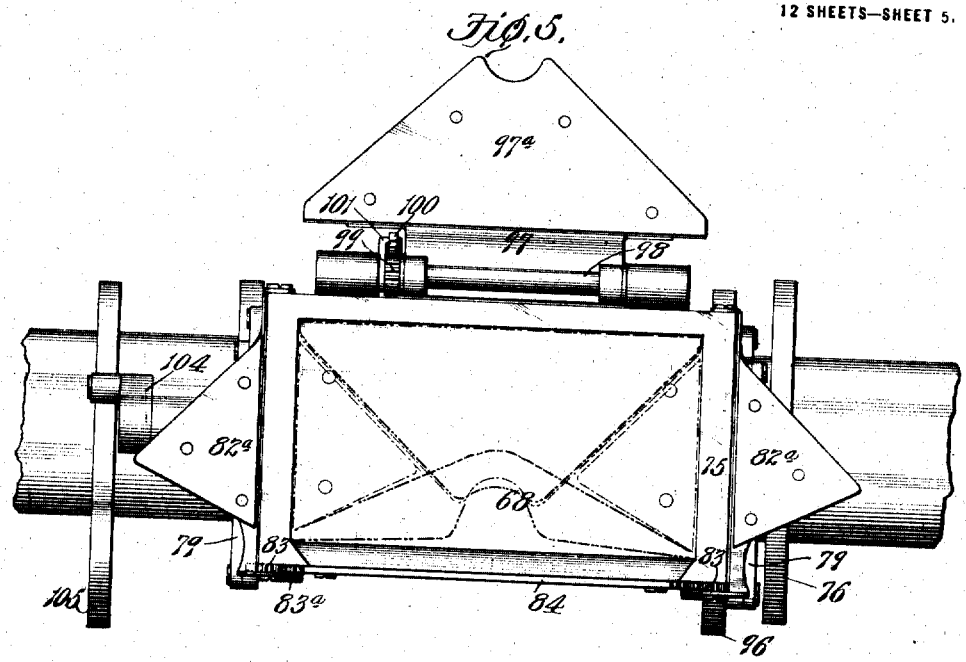
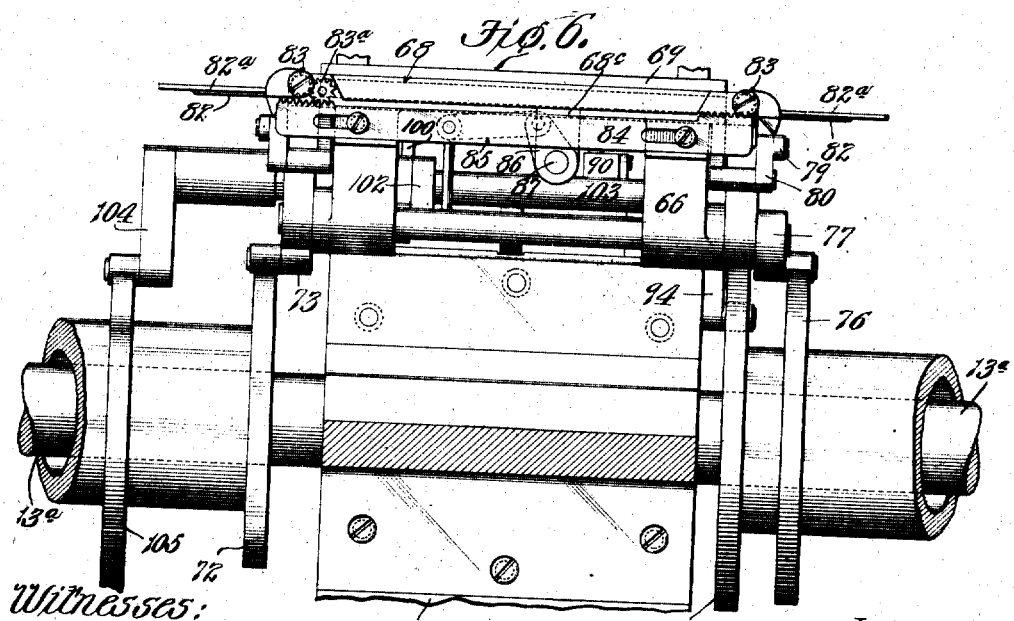
Witnesses:
M. P. Smith
Levere Clark
Inventor:
O. W. Cowgill
By F. R. Cornwall Atty.

O. W. COWGILL.
MACHINE FOR MAKING ENVELOPS.
APPLICATION FILED MAY 18, 1909.
1,218,597.
Patented Mar. 6, 1917.
12 SHEETS—SHEET 6.
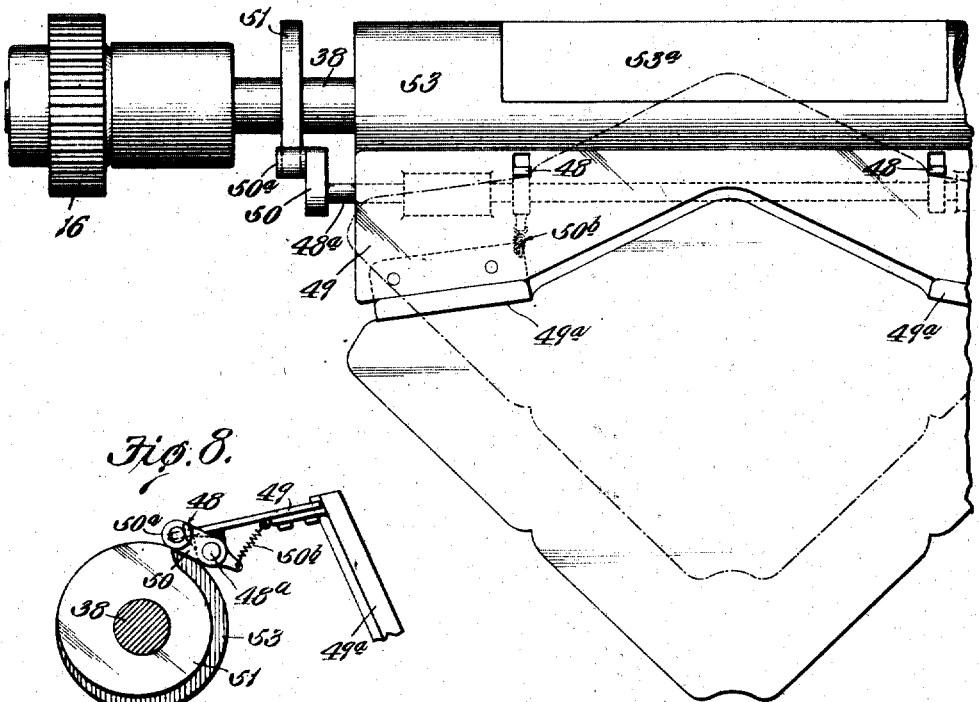
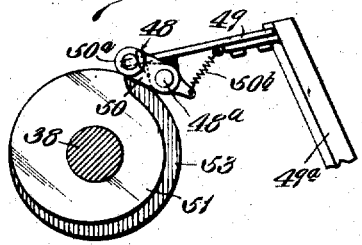
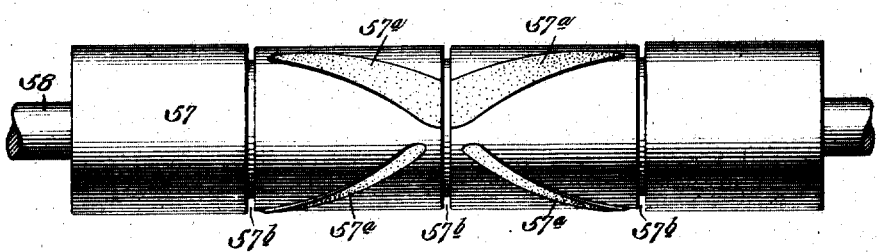
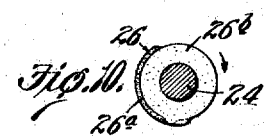
Witnesses:
M. C. Smith
Lenore Clark
Inventor:
O. W. Cowgill.
By F. R. Cornwall, Atty.

O. W. COWGILL.
MACHINE FOR MAKING ENVELOPS.
APPLICATION FILED MAY 18, 1909.
1,218,597.
Patented Mar. 6, 1917.
12 SHEETS—SHEET 7.
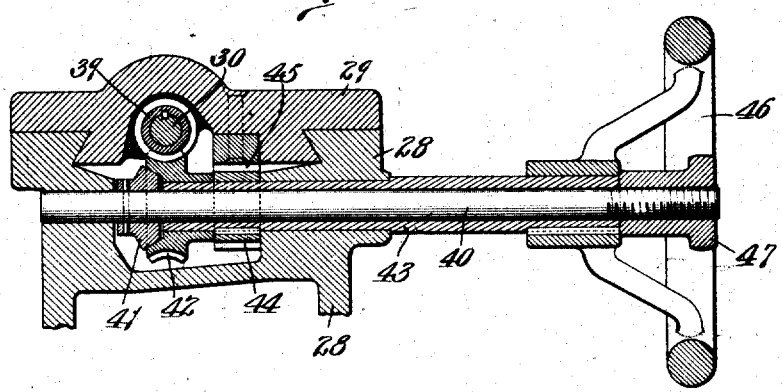
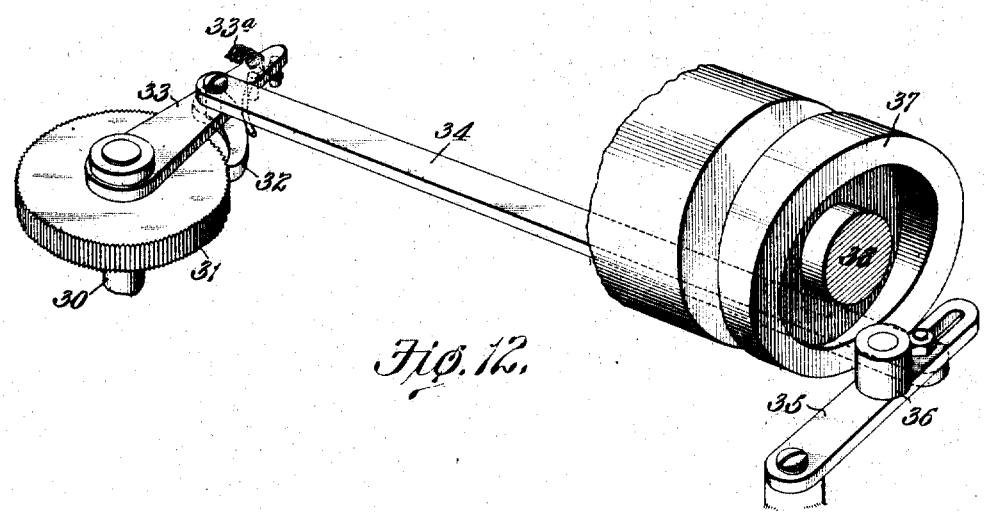
Witnesses:
N. P. Smith
Lenore Clark
Inventor:
O. W. Cowgill
by F. R. Cornwall
Atty.

O. W. COWGILL.
MACHINE FOR MAKING ENVELOPS.
APPLICATION FILED MAY 18, 1909.
1,218,597.
Patented Mar. 6, 1917.
12 SHEETS—SHEET 8.
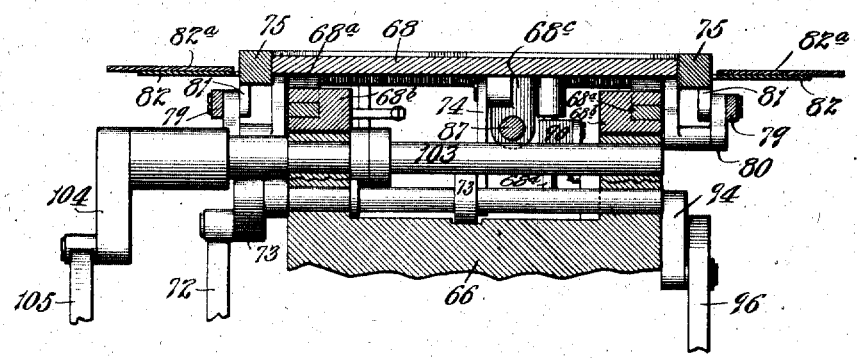
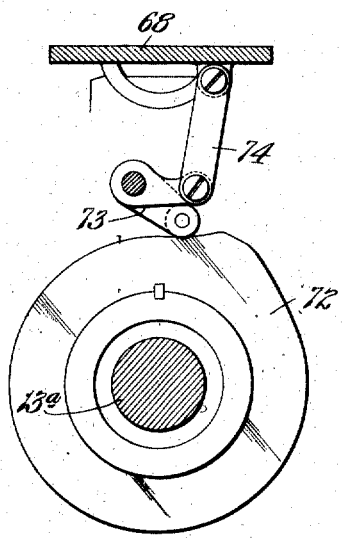
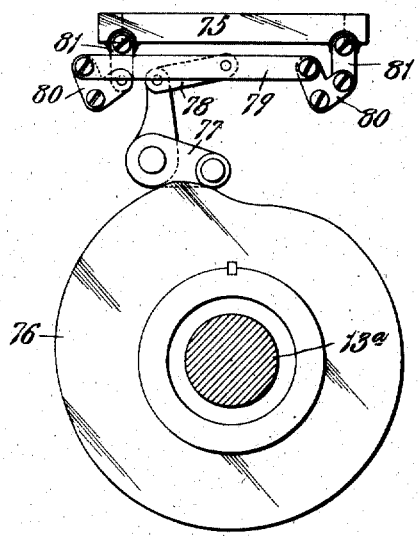
Witnesses:
Inventor:
O. W. Cowgill.

O. W. COWGILL.
MACHINE FOR MAKING ENVELOPS.
APPLICATION FILED MAY 18, 1909.

1,218,597.

Patented Mar. 6, 1917.
12 SHEETS—SHEET 9.

Witnesses:

Inventor:
O. W. Cowgill.

O. W. COWGILL.
MACHINE FOR MAKING ENVELOPS.
APPLICATION FILED MAY 18, 1909.

1,218,597.

Patented Mar. 6, 1917.
12 SHEETS—SHEET 10.

Witnesses:
M. P. Smith
Lenore Clark

Inventor:
O. W. Cowgill
by F. R. Cornwall, Atty.

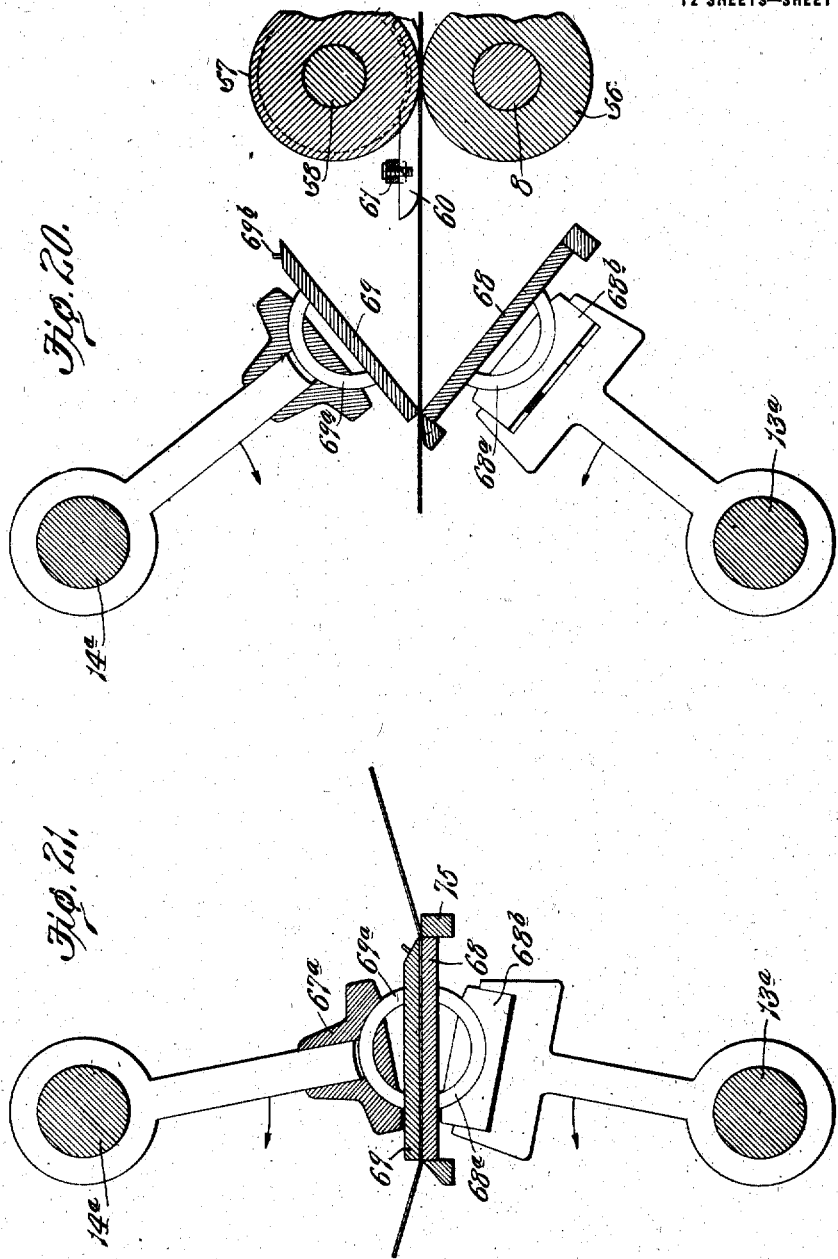

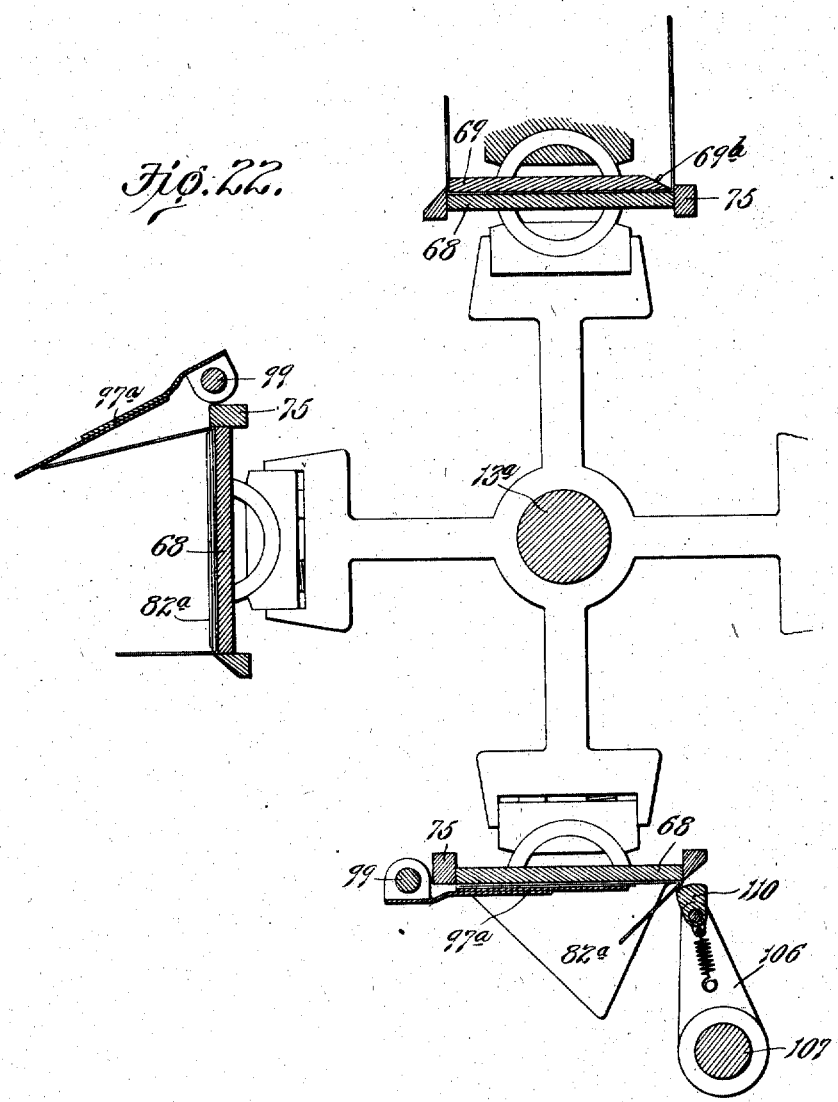

UNITED STATES PATENT OFFICE.

ORPH W. COWGILL, OF ST. LOUIS, MISSOURI, ASSIGNOR OF TWELVE ONE-HUNDREDTHS TO OTTO F. STIFEL, TWELVE ONE-HUNDREDTHS TO L. H. TIEMANN, TWELVE ONE-HUNDREDTHS TO A. G. SOLARI, AND TWELVE ONE-HUNDREDTHS TO JACOB BONGUER, ALL OF ST. LOUIS, MISSOURI, AND TWELVE ONE-HUNDREDTHS TO THE ENVELOPE MANUFACTURING COMPANY, OF ST. LOUIS, MISSOURI, A CORPORATION OF MISSOURI.

MACHINE FOR MAKING ENVELOPS.

1,218,597.     Specification of Letters Patent.     Patented Mar. 6, 1917.

Application filed May 18, 1909. Serial No. 496,706.

*To all whom it may concern:*

Be it known that I, ORPH W. COWGILL, a citizen of the United States, residing at St. Louis, Missouri, have invented a certain new and useful Improvement in Machines for Making Envelops, of which the following is a full, clear, and exact description, such as will enable others skilled in the art to which it appertains to make and use the same, reference being had to the accompanying drawings, forming part of this specification, in which,—

Fig. 4 is a side elevational view, in full size, of the gripping plate and its associate parts.

Fig. 5 is a plan view of the lower gripping plate and its associate parts.

Fig. 6 is a rear elevational view of the lower gripping plate and its associate parts.

Fig. 7 is a top plan view illustrating the means for positioning a selected blank preparatory to its being gripped by the feed roller.

Fig. 8 is a detail view of the disappearing pins and their associate parts employed in the feeding mechanism.

Fig. 9 is a detail view of the gumming roller.

Fig. 10 is a detail view of the feed roller.

Fig. 11 is a detail view of the means for manually operating the plate on which is arranged the stack of envelop blanks.

Fig. 12 is a detail view of the mechanical means for raising said plate to elevate the stack as the blanks are fed from the top thereof.

Fig. 13 is a vertical sectional view through the lower gripping plate and its associate parts.

Fig. 14 is a diagrammatic view illustrating the means for rocking said lower gripping plate to maintain the same parallel to its companion.

Fig. 15 is a diagrammatic view of the means for operating the creasing frame identified with the lower gripping plate.

Fig. 20 is a diagrammatic view illustrating the position of the upper and lower gripping plates when a blank is fed therebetween in proper position to be gripped.

Fig. 21 is a similar view showing the plates parallel to each other and gripping the blank just before the creasing frame operates.

Fig. 22 is a diagrammatic view illustrating the several succeeding operations upon the blank, the creasing frame being raised at the upper portion of said figure, the end plates being folded in at the left of said figure, and the sealing plate being folded in, the end plates being retracted at the bottom of said figure.

Figure 1:
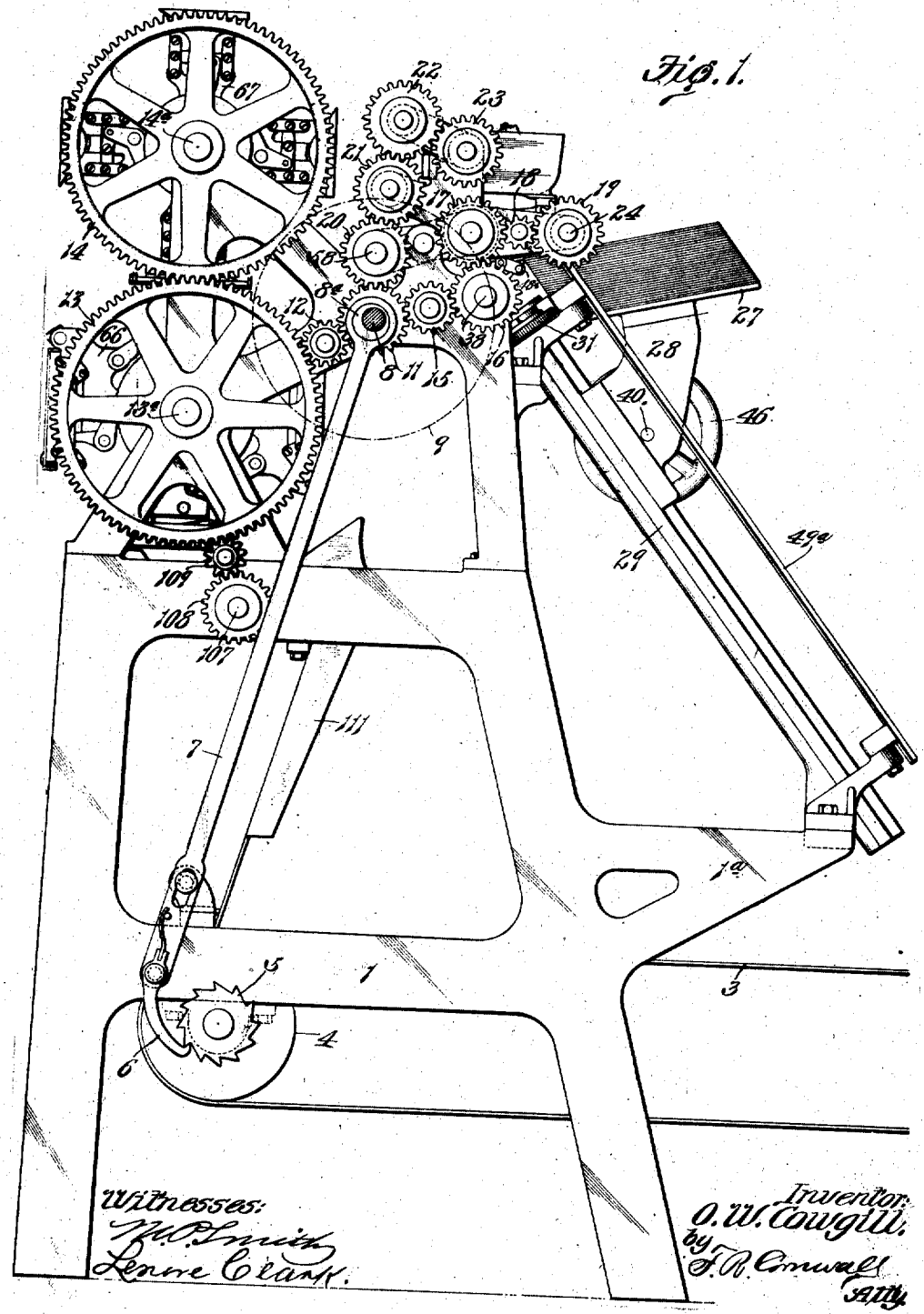
Figure 1 is a side elevational view of my improved machine.

This invention relates to a new and useful improvement in machines for making envelops, the object being to simplify the construction of machines of this character and to increase the output of such machines.

According to my present invention, the envelop blanks are stacked upon a suitable plate, which is automatically elevated as the blanks are successively fed from the top of the stack. These blanks after being fed from the top of the stack are properly positioned by pins which disappear and permit the onward feed of the blank when gripped by the feeding rollers. In this way the exact position of the blank with respect to the gripping plates is maintained. While being fed onward by the feeding rollers the blank receives gum along the edges of its flaps at appropriate points. The gummed blank is then gripped between two plates coöperating as companions and constituting with their associate parts one of a series of folding mechanisms mounted to revolve about fixed axes and successively acting upon blanks as the blanks are fed between the gripping plates. While held between the plates, the flaps at the sides of the blank are creased, and after the upper gripping plate recedes and while the blank is held by the creasing frame, the end flaps are folded in. The bottom flap is then folded down and sealed to the folded end flaps. The gummed top flap which is to remain free may be further creased, if desired, after which the completed envelop is discharged on to a conveyer belt, where it may either be sent to a drying room or be permitted to dry preparatory to being packed.

In the accompanying drawings, 1 indicates the side frames, which are preferably made of castings connected together by cross bars 2. 3 is a belt mounted in the lower portion of this frame passing over a sheave 4. In the end of the axle of this sheave is arranged a ratchet 5, with which coöperates pawl 6 on the end of a pitman 7 having an eye in its upper end to embrace an eccentric $8^a$ mounted on the power shaft 8 of the machine. In this manner the belt 3 is driven, step by step, to remove the finished envelops that are deposited thereon.

Shaft 8 is provided with fast and loose pulleys 9 and $9^a$ (see Fig. 3) at one end and a hand wheel 10 at the other end, the latter being to enable the operator to properly adjust the several parts in relation to each other so that the blanks will be fed properly after the machine is started. 11 is a pinion mounted on shaft 8, with which meshes a pinion 12 for driving gear 13 and its companion meshing gear 14, these gears mounted upon the ends of shafts $13^a$ and $14^a$ to be hereinafter described. Also meshing with gear 11 is a transmitting gear 15 which drives the gear 16 on the end of one of the feed rollers, said gear 16 meshing with the gear 17 of the companion feed roller.

A pinion 18 driven through gear 17 drives a gear 19 on the end of the roller which initially moves the blank into position against the disappearing pins.

Also meshing with gear 11 is a gear 20 on the end of the gumming roller, which gear 20 drives a train of gears 21, 22 and 23 on the ends of gum-spreading rollers, the roller 63 being arranged in a pot for collecting the gum to be distributed and spread by the intervening rollers.

Figure 2:
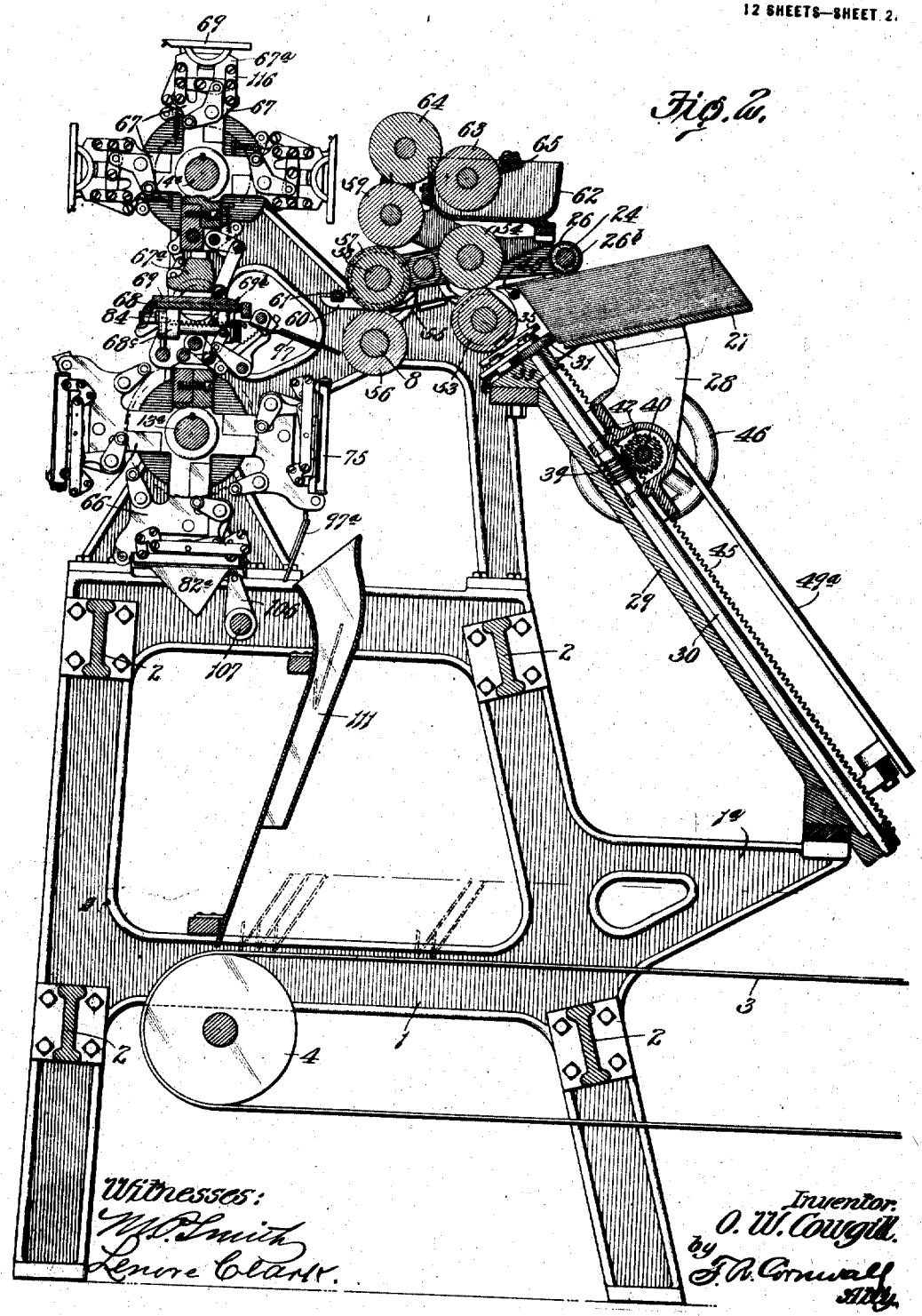
Fig. 2 is a vertical sectional view through the same.
Figure 3:
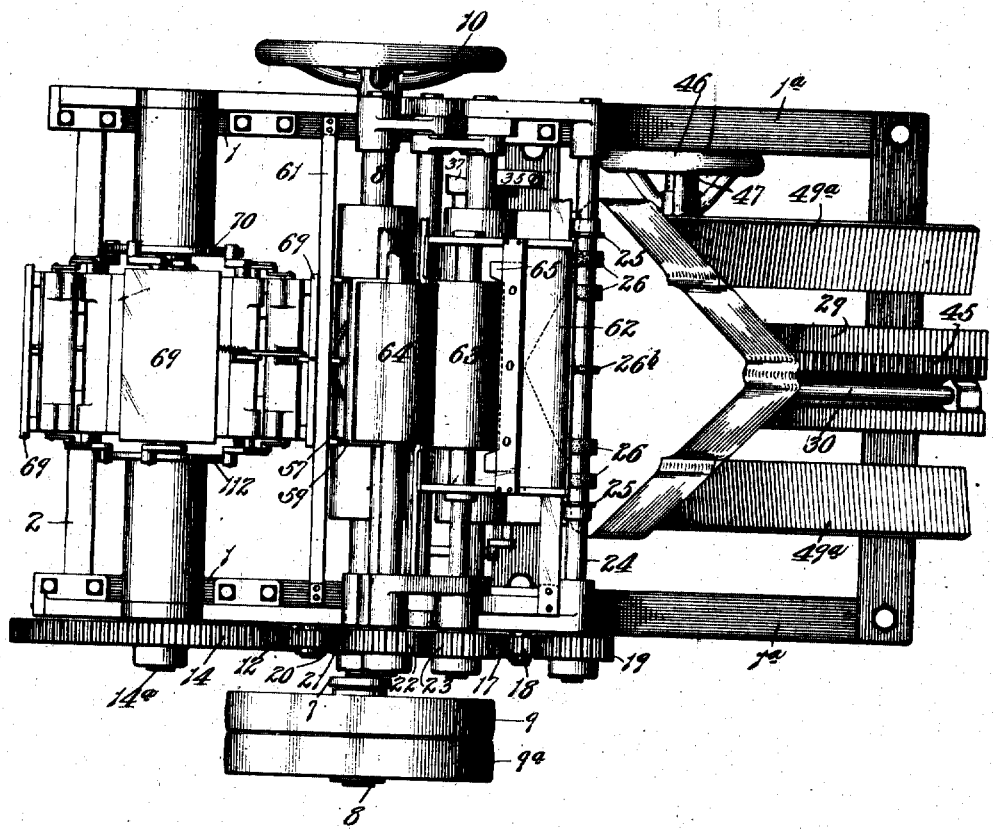
Fig. 3 is a top plan view.
Figure 16:
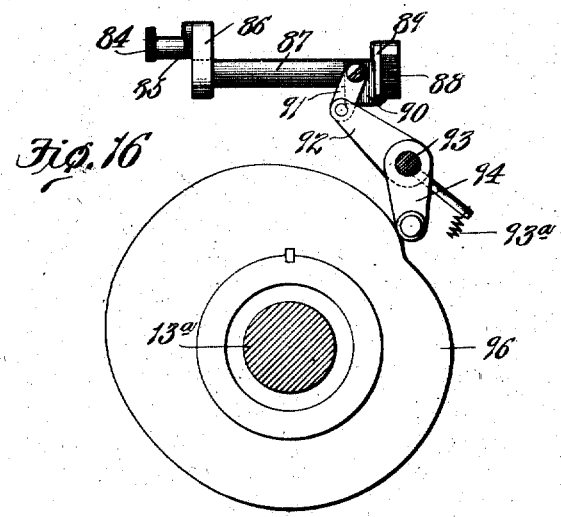
Fig. 16 is a diagrammatic view of the means for operating the end-folding plates identified with the lower gripping plate.
Figure 17:
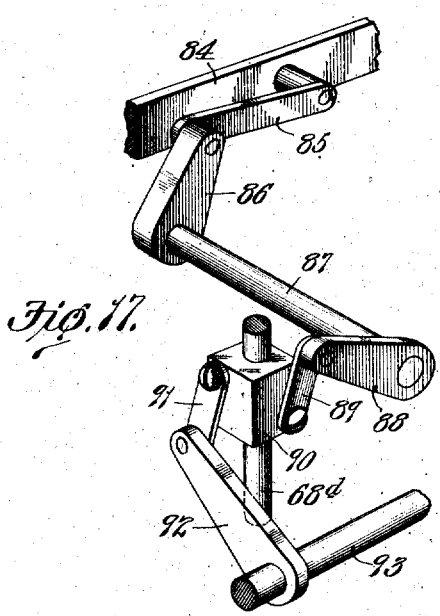
Fig. 17 is a detail view showing the lever connection between the cam and the rack bar identified with the end-folding plates.

Referring now to Fig. 3, it will be observed that the pinion 19 is on the end of a shaft 24 carrying two polished collars 25 bearing upon the uppermost envelop blank. These polished collars have no tendency to feed the blank. Between the polished collars are rubber rings 26, which have enlarged portions $26^a$ (see Figs. 2 and 10), which enlarged portions are of the same or greater diameter than the collars 25. When the shaft 24 is rotated, enlarged portions $26^a$ on the two rubber rings adjacent the collars 25 are so positioned that they will in their rotation feed the topmost blank into the machine between the feeding rollers hereinafter described, the central ring $26^b$ having an enlarged portion which coöperates with the uppermost blank to give it a final and excessive movement against the disappearing stop pins, so that if the blank is not properly positioned against the stop pins by the rings 26, the ring $26^b$ will correct the inaccuracy. If the blank is fed forward to its proper position by the rings 26, then the ring $26^b$ merely presses the blank more firmly against the stop pins, causing it to bulge slightly but which bulge disappears the instant the ring $26^b$ lets go, which substantially coincides with the time that the feeding rollers take hold of the blank by what might be termed its top flap.

The stack of envelop blanks is arranged upon a plate 27 carried by a movable frame 28 dovetailed upon a bar 29 (see Figs. 1, 2, 3 and 11). In the channel of this bar 29 is arranged a rod 30, upon whose upper end is mounted a fine-toothed ratchet 31. Coöperating with this ratchet is a spring-pressed pawl 32, said pawl being mounted upon an arm 33 loosely arranged upon the upper end of rod 30, to which arm is connected a link 34 (see Fig. 12), which link is connected to an arm 35 having a roller 36 coöperating with a side-faced cam 37 on the end of the feed roller shaft 38, upon whose opposite end the gear 16 is mounted. By this construction, at each revolution of the feed roller the pawl 32 is vibrated. A spring $33^a$ holds the roller 36 against the side-faced cam 37. As shown in Fig. 11, rod 30 is provided with a longitudinal groove for receiving a key or projection in the hub or sleeve of worm 39 confined between lugs or bearings on the frame 28, which extend into the channel of bar 29 and embrace the rod 30.

40 indicates a shaft mounted in suitable bearings in the frame 28. This shaft has a friction member 41 pinned thereto (see Fig. 11), which friction member coöperates with a worm wheel 42 in mesh with the worm 39. Worm wheel 42 is mounted upon a sleeve 43, upon which is keyed a pinion 44 in mesh with a rack 45 secured to the channel bar 29.

On the outer end of sleeve 43 is keyed a hand wheel 46, whereby the frame 28 and its carrier plate 27 can be manually raised or lowered at the will of the operator by rotating the hand wheel 46 in the proper direction. In this operation, the worm is slid vertically upon the rod 30, but does not rotate. In order to clamp the hand wheel to the worm gear 42, I thread the end of rod 40 and provide the same with a hand nut 47. When this hand nut is turned so that the friction disk 41 will clamp the worm gear therebetween and the pinion 44, the hand wheel 46 can no longer be freely turned by the hand but only by the worm gearing. Thus, when the pawl 32 is vibrated and the rod 30 rotated with a step-by-step movement, the plate 27 is caused to rise, the upward movement of the plate at each operation being equal to the thickness of an envelop blank. In order to regulate this upward movement of plate 27, I provide the arm 35 with a slot so as to adjust the connection of link 34 outwardly or inwardly, and so increase or diminish the stroke of pawl 32, depending upon the thickness of the paper of the blanks to be fed.

As the stack of blanks is fed upwardly and the uppermost blank is moved by the rubber rings heretofore described, such movement positions the blank against disappearing stop pins 48, heretofore referred to. These stop pins are mounted upon a shaft 48$^a$ under a plate 49 (see Figs. 2, 7 and 8), said pins projecting up through openings in the plate as shown.

An arm 50, carrying a roller 50$^a$ is held by a spring 50$^b$ against the edge of cam 51 mounted on a shaft 38, on which pinion 16 is mounted. By this construction, the stop pins 48 project through the openings in plate 49 to coöperate with the envelop blank while the rubber rings are feeding said blanks thereagainst. As shaft 38 rotates the cam 51 permits the stop pins 48 to recede or disappear, and coincidentally therewith a feed roller 53, coöperating with its companion roller 54, grips the top flap of the envelop blank and moves it onward. The feed roller 53 just referred to is provided with a flat face 53$^a$, which in its rotation is presented to the blank and permits the blank to be properly positioned against the pins 48, as shown in Fig. 2, and when the blank is properly positioned, the edge of said flat portion of the roller grips the blank and feeds it onward. By providing roller 53 with a flat face it may be rotatively adjusted on the shaft 38 by means of set screws (not shown), and the time that the blank is gripped between the rollers, with relation to the other parts of the machine exactly determined.

In connection with the above, I wish to say that the flat portion 53$^a$ is not co-extensive with width of the blank, but is only wide enough to permit of the introduction of a top flap. In this manner it is possible to feed a blank against the stop pins in position to be gripped by the feed rollers 53 and 54 before the preceding blank has been fed onward beyond said rollers, the preceding blank being fed onward by the cylindrical ends of roller 53 and interfering in no way with the introduction of the top flap of the next blank into the space provided by the flat portion of roller 53. I am thus enabled to operate the rubber rings which initially position the envelop blanks against the stop pins at a slow speed compared to the feeding movement of rollers 53—54, which is of advantage in that such slower speed enables the rubber rings to easily pick up and move the top blank.

Guide bars 49$^a$ are adjustably mounted in brackets 1$^a$ extending from the side frames, said guide bars extending parallel to the direction of travel of the plate 27 and its superimposed stack of envelop blanks. These guide bars are located on each side of the "top flap" and hold the blanks in the proper position to be fed. Said blanks are fed by the rubber rings 26$^a$, the uppermost blank, if slightly below the upper edges of the guide bars, being easily forced up and over the inclined edges of said guide bars. The plate 27 is arranged at the desired angle, with relation to the guide bars, so that the uppermost blank will be fed, though it is as much as one quarter of an inch below the upper edges of the guide bars. The stroke of pawl 32 need not, on this account, be adjusted to feed the stack exactly the proper amount each time.

The blanks, while between the rollers 53 and 54, are guided by plate 55 to pass between rollers 56 and 57, the former of which is mounted on the power shaft 8 of the machine, while the latter is mounted on a shaft 58 on which is arranged the gear 20. Roller 57 is the gumming roller and has raised surfaces 57$^a$ of proper material whereby the gum is received from the distributing roller 59 and impressed upon the flaps of the envelops. Roller 57 is provided with grooves 57$^b$ in its periphery, in which are arranged stripping blades 60, said blades being mounted upon a suitable bar 61 arranged between the side frames of the machine. The function of these blades 60, which extend forwardly above the plate 55 (see Fig. 2), is to prevent the envelops from following the gumming roller, and by stripping them, to cause them to be guided between the gripping plates, as shown in Fig. 20. The gum for the purpose is contained in a pot 62 and is carried by a roller 63 to a roller 64 which is in contact with the distributing roller 59 heretofore referred to. A scraping blade 65 regulates amount of gum transferred from roller 63 to roller 64.

I will now describe the manner in which the flaps on the gummed blank are folded and the envelop formed.

Referring to Fig. 2, it will be observed that on the shafts 13$^a$ and 14$^a$ are sleeves having radial projections, to which are secured, by means of suitable screws, removable frame pieces 66 and 67 respectively which carry the envelop-forming mechanism, the devices on said frame pieces being complementary to each other. There may be as many of these complementary, revoluble envelop-forming mechanisms, each complete in itself, as desired. In the accompanying drawings, I have shown four of such complete forming mechanisms. As the several forming mechanisms are the same in construction and operation, I will describe but one of them.

As the gummed blank is fed between the rollers 56 and 57, being stripped by the blades 60, the upper and lower gripping plates 68 and 69 approach each other, as shown in Fig. 20, until their advancing edges meet. The blank is now caught, and the contact of the gripping plates at this time, if the blank has been properly fed and positioned, is along the line of the crease of the top or free flap of the envelop. It is obvious that the gripping plates cannot travel in intersecting arcs, and means are provided to rock both of said plates from the position shown in Fig. 20 to the position shown in Fig. 21, during which time the grip of the plates upon the blank is not relinquished. Both gripping plates could be mounted upon pivoted bolts, but I prefer to provide them with semi-circular supports 68$^a$ and 69$^a$ respectively, which fit in appropriately curved ways. In this manner, I am enabled to locate the axis of the rocking movement of each plate substantially coincident with the working face thereof.

One of the gripping plates is preferably made yielding so that said plates can coöperate with different thicknesses of paper. I have shown the lower gripping plate as being mounted in a yielding block 68$^b$ in the frame 66, suitable springs being provided to press said block outwardly.

Figure 18:
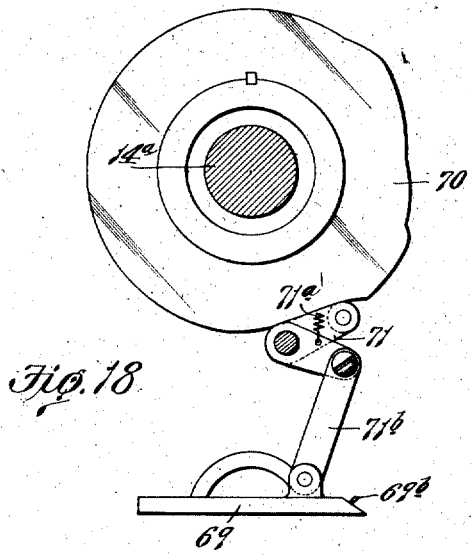
Fig. 18 is a diagrammatic illustration of the upper gripping plate and means for rocking it to maintain parallelism with its companion.
Figure 19:
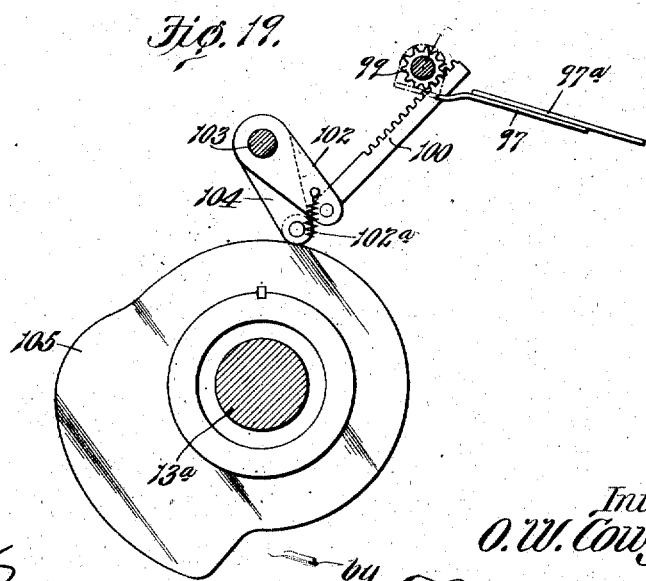
Fig. 19 is a diagrammatic view illustrating means for operating the sealing plate.

Means for rocking the upper gripping plate is illustrated in Figs. 4 and 18, and consists of a cam 70 fixed to one of the side frames of the machine. This cam coöperates with a roller on one end of a bell crank lever 71 which is held thereagainst by means of a spring 71$^a$, said bell crank lever being connected by a link 71$^b$ to the rear edge of the upper gripping plate under consideration. As the gripping plate revolves, the roller passes over the enlarged portion of cam 70 to the flat face thereof whereupon the spring 71$^a$ forces the upper gripping plate to rock upon its axis. During this period the upper gripping plate assumes a parallel position with respect to its companion, see Fig. 21.

The lower gripping plate is rocked by substantially the same character of means illustrated in Figs. 4, 6 and 14, in which a cam 72 is mounted on a fixed sleeve extending inwardly from the side frame of the machine. This cam 72 is provided with an enlarged portion for coöperating with the roller on one member of the bell crank lever 73, the other member of which bell crank lever is connected by a link 74 to the lower edge of the gripping plate 68.

With respect to the manner in which the blank is started after it leaves the gumming rolls, the advancing edge of the lower plate 68 picks up the envelop in its revolution and straightens it. When the advancing edge of the plate 69 grips the blank, the travel of these forming plates, being slightly greater than the peripheral speed of the gumming rolls, will cause the blank to be held taut. The cams which operate the gripping plates are so shaped that they will not clamp the blank tightly until the blank is ready to be released by the gumming rolls, at which time it will be held between the gripping plates. All danger of tearing the envelop is avoided by the immediate release thereof by the gumming rolls.

Before the centers of the gripping plates reach a vertical line drawn through the centers of the shafts 13$^a$ and 14$^a$, said plates are forced by their cams and connections to assume parallelism and to tightly grip the blank between them.

75 indicates the creasing frame, which, when the parts are in position shown in Fig. 21, is moved upwardly above the lower edge of the upper gripping plate, as shown in the upper portion of Fig. 22. This frame is a rectangular frame extending around the four sides of the lower gripping plate. (See Figs. 5 and 13). The means for operating this frame is shown in Figs. 4, 6 and 15, and consists of a cam 76 which coöperates with the roller on one member of the bell crank lever 77, whose other member coöperates with a link 78 connected to a bar 79. This bar is connected to bell crank levers 80, which bell crank levers are connected by links 81 to the corners of the frame 75. In referring to the bell crank lever 77, it must be understood that the pivoted rod of said lever extends across the frame 66 in which it is mounted and carries two upwardly extending members (as rock arms), the parts 78 to 81 inclusive being duplicated at each end of the frame. Thus the creasing frame 75 is supported by links 81 at its four corners. By referring to Fig. 15 it will be seen that as the roller rides up the enlarged portion of cam 76, the creasing frame will be elevated and remain elevated at least during one quarter revolution of the forming mechanism, during which time the upper gripping plate will be withdrawn from the blank. This withdrawal, however, does not affect the creased blank with its four outstanding flaps, as the blank is well seated upon the lower gripping plate and within the creasing frame. After the end plates fold in the end flaps, the creasing frame is retracted.

Means for operating the end-folding plates is illustrated in Figs. 4, 5, 6, 13, 16 and 17. 82 are end-folding frames to which are secured triangular plates 82ᵃ designed to coöperate with the end flaps of the envelops. These plates 82ᵃ are removably secured to the frames 82, so that different thicknesses of plates can be employed, depending upon the amount of pressure it is desired to be exerted upon the end flaps. The thickness of plates 82ᵃ would also be controlled by the thickness of paper in the envelop blank. The ends of frame 82 are formed with perforated ears through which pass pivot screws into the creasing frame, and to the outermost ears are secured pinions 83. With one of these pinions coöperates an idle pinion 83ᵃ for the purpose of reversing motion. The single pinion 83 and the reversing pinion 83ᵃ coöperate with rack teeth on a bar 84 mounted by a slot-and-pin connection upon the creasing frame. A link 85 connects this rack bar with a rock arm 86 mounted on a rock shaft 87 journaled in the post 68ᶜ depending from the lower gripping plate. To the opposite end of this rock shaft 87 (see Fig. 17) is secured a rock arm 88 connected by a link 89 to a block 90 slidingly mounted on a post 68ᵈ depending from the lower gripping plate 68. A link 91 connects block 90 with a rock arm 92 on a shaft 93, said shaft having a rock arm 94 at its end carrying a roller coöperating with a fixed cam 96 arranged alongside of the cam 76. A spring 93ᵃ connected to a pin on the shaft (see Fig. 4) holds the roller against the cam. When the roller rides upon the enlarged portion of the cam, the end plates 82ᵃ are folded inwardly upon the blank, as shown at the left in Fig. 22, and in dotted lines in Fig. 5. As shown in Fig. 4, the roller is just starting up the enlarged portion of the cam, and the end plates, consequently, are just commencing their upward and inward movement.

After the end plates have folded the end flaps, as shown at the left in Fig. 22, the creasing frame is partially retracted after the roller passes the heel of the cam, see Fig. 15, and rides down the enlarged eccentric portion thereof, which extends approximately one quarter of a circle, and the sealing plate, or plate which presses the bottom flap upon the folded end flaps, is operated.

The means for operating this sealing plate, as it might be termed, is best illustrated in Figs. 4, 5, 6, 13 and 19. 97 is a frame pivotally mounted upon a rod 98 journaled in suitable bearings in the frame 66, said rod having a pinion 99 fixed thereon, which pinion coöperates with a rack 100, said rack being held in position against the pinion by means of a bail or stirrup 101 swinging from the rod 98.

Rack 100 is mounted in the end of a rock arm 102 carried by a shaft 103, upon which shaft is arranged a rock arm 104 whose roller coöperates with a fixed cam 105 arranged alongside of the cam 72. A spring 102ᵃ holds the roller against the cam. When the roller is riding upon the reduced diameter of the cam, frame 97 (which is provided with a removable plate 97ᵃ for reasons described with reference to plate 87ᵃ) is in an inoperative position. When, however, the roller rides up the enlarged diameter of said cam, the frame 97 is operated so as to cause the plate 97ᵃ to engage the bottom flap and press the same with its gummed edges against the end flaps. The sealing plate 97ᵃ can fold the bottom flap inwardly while the end-folding plates 82ᵃ are in position.

The operative position of the sealing plate is shown at the bottom of Fig. 22, and when the forming mechanism has reached this point in the revolution of its carrier, the roller on the end of arm 104 is in readiness to drop down the abrupt shoulder on the cam on to the reduced portion, whereby the envelop is released from the forming mechanism. Prior to this time, however, the creasing frame has been fully retracted, such full retraction occurring when the roller reaches the end of the enlarged eccentric portion of cam 76, which extends one quarter of a circle from the heel of the cam and rides upon the concentric portion of the cam, which constitutes the major portion thereof, extending over half of the circle.

Means are provided for further creasing the top flap of the envelop, which means consist of revolving arms 106 (see Figs. 2 and 22), which arms are mounted upon shaft 107, having a gear 108 receiving motion through an idle pinion 109 meshing with the gear 13. (See Fig. 1.) Arms 106 are provided with a spring-held bar 110 which is so timed with relation to the forming mechanism that it will coöperate with the top flap of the envelop at the edge of the lower gripping plate, to further crease said top flap before the sealing plate releases the envelop, as shown in Fig. 22. The envelop, when released by the sealing plate (see Fig. 2) will be received in a guiding chute 111 and deposited upon the belt 3 to be carried away from the machine.

The upper gripping plate heretofore referred to, in addition to being rocked on its axis, is also drawn inwardly or upwardly when in coöperation with its companion lower gripping plate, to compensate for the differences in the path of circumferential travel between the edges and the center of said plate. This will be seen by reference to Figs. 20 and 21. In Fig. 21 it will be seen that the gripping plates are parallel to each other before the centers thereof reach the vertical line drawn between the centers of the shafts 13ᵃ and 14ᵃ. The plates are held in a horizontal position at this time by reason of the rocking mechanism heretofore referred to, and in order to compensate for the arcuated movement and to insure the plates traveling in a horizontal line, means are provided for causing the upper gripping plate to recede slightly during this period of coöperating of the plates and then to be thrust outwardly to its normal path of movement. This movement is best shown in Figs. 2 and 4, wherein it will be seen that a cam 112 is fixed to the side framing of the machine. The fluctuation of this cam consists in a depression near the bottom of the circular track. 113 indicates a bell crank lever, one end of which is provided with a roll to coöperate with cam 112. The other member of this bell crank lever is connected by a link 114 to a bar 115, which bar is connected to toggle levers 116 at each end. The inner pair of toggle levers is connected to the frame 67, while the outer pair of toggle levers is connected to the head piece 67ᵃ wherein the curved pieces of the upper gripping plate are mounted. Whenever the toggle is broken, as when the bell crank lever 113 drops into the recess of cam 112, the upper gripping plate is drawn inwardly or upwardly, by virtue, of such movement being imparted to the head piece 67ᵃ which carries the gripping plate and which head piece is connected to the outer (or lower) toggle levers 116, the springs under the lower gripping plate causing the two plates to hug each other and hold the envelop blank firmly between them. It will be observed that the toggle levers which move the head piece 67ᵃ and its carried gripping plate upwardly or inwardly with respect to the shaft 14ᵃ, have their upper members 116 connected to the frame 67, said toggle levers being controlled by the bar 115 connected by the link 114 to the bell-crank lever 113. The shaft and its bell-crank lever are surrounded by a torsional spring (see dotted lines, Fig. 4) which exercises a pressure to force the roller into the recess of cam 112 and thus move the upper gripping plate upwardly. It is during this period of coöperation between the plates and while they are traveling in substantially a straight horizontal line that the creasing frame is operated. As the toggle levers are straightened, the final limit of this horizontal movement is reached, and when the roller on the bell crank lever again reaches its normal path of movement on the cam, the plates are ready to separate. The purpose in having the plates coöperate with each other for this extended period of time, is to enable the creasing frame to operate slowly and with an easy action. Otherwise, if the plates merely met at the intersection of their arcs of movement and the creasing frame was compelled to do its work at the instant of such meeting, the machine could not be operated to advantage at any great speed.

To prevent the innermost edge of the upper gripping plate from removing the gum from the bottom or sealing flap when said upper gripping plate is withdrawn, I preferably arrange one or more pins 69ᵇ at about the center of beveled rear edge of said upper gripping plate, which pins contact with the bottom flap and prevent same from rubbing against the upper gripping plate. By locating the pins in the center of the gripping plate, said pins travel in a path not occupied by the gum, and consequently do not remove any of the gum or become sticky so as to interfere with the proper operation of the machine.

So far as I am aware, I believe I am the first, in the art of envelop making, to employ complementary parts, revolving about different axes and coöperating with each other in the formation of envelops.

I am aware that minor changes in the construction, arrangement and combination of the several parts of my device can be made and substituted for those herein shown and described, without in the least departing from the nature and principle of my invention.

What I claim is:

1. In a machine for making envelops, complementary mechanisms revolving about different axes and coöperating with each other for the formation of envelops, one of said complementary mechanisms having a creasing frame which simultaneously acts upon the four sides of the envelop, and means for rocking said complementary mechanisms to compensate for varying arcs of travel.

2. In a machine for making envelops the combination of complementary mechanisms operating about different axes and coöperating with each other in the formation of envelops from blanks, fixed cams for operating the several parts of the forming mechanism, one of which parts is a creasing frame which simultaneously operates upon all four sides of an envelop, and means for rocking said creasing frame and its complementary part to compensate for the varying arcs of movement of said parts.

3. In a machine for making envelops the combination of gripping plates revolving about different centers, forming mechanism coöperating therewith, said forming mechanism including a creasing frame which is moved to simultaneously crease the four sides of the envelop, and means for rocking said gripping plates to hold them in parallelism while moving about their respective axes.

4. In a machine for making envelops the combination of gripping plates revolving about different centers, mechanism coöp- erating therewith to rock said plates and hold them close in parallelism, means for retracting one of said plates, and a creasing frame which coöperates with said gripping plates while they are closed to simultaneously crease the four sides of the envelop.

5. In a machine for making envelops, the combination with gripping plates revolving about different centers and adapted to close upon each other, and means for rocking said gripping plates in their respective mounts, and a creasing frame which coöperates with said gripping plates while they are closed to simultaneously crease the four sides of the envelop.

6. In a machine for making envelops, the combination of gripping plates revolving about different centers and adapted to close upon each other, one of which gripping plates is yieldingly mounted, and means for rocking said gripping plates in their respective mounts.

7. In a machine for making envelops, the combination with upper and lower revoluble gripping plates adapted to close upon each other, means for rocking said gripping plates, means for moving one of said gripping plates inwardly with respect to its axis of rotation, and a creasing frame which coöperates with said gripping plates while they are closed to simultaneously crease the four sides of the envelop.

8. In a machine for making envelops, the combination with upper and lower gripping plates which revolve about separate axes, said plates gripping an envelop blank to be folded in their revolution, means for rocking said plates to parallelism after the blank has been gripped between the plates, and means for imparting inward movement to one of said plates while the blank is held by said plate.

9. In a machine for making envelops the combination of gripping plates revolving about different centers, one of which gripping plates is yieldingly mounted, means for rocking said gripping plates in their respective centers so as to bring them into parallelism, and means for imparting movement to said gripping plates whereby they are caused to approach and recede from each other independently of their revoluble travel 10. In a machine for making envelops, the combination with revoluble upper and lower gripping plates, a creasing frame which is operated to initially crease the flaps of the envelop blank on all four sides while the same is held between said gripping plates, and a fixed cam for operating said creasing frame.

11. In a machine for making envelops, the combination with revoluble upper and lower gripping plates, means for rocking said gripping plates to bring them into parallelism, a creasing frame for simultaneously creasing the four sides of the envelop, and end wing plates pivotally mounted on said creasing frame.

12. In a machine for making envelops, the combination with revoluble upper and lower gripping plates, means for rocking said gripping plates to bring them into parallelism, a creasing frame for simultaneously creasing the four sides of the envelop, end wing plates pivotally mounted on said creasing frame, and a fixed cam for operating said end wing plates.

13. In a machine for making envelops, the combination with revoluble upper and lower gripping plates, a creasing frame coöperating with one of said plates, a fixed cam for operating said creasing frame, end-folding plates pivotally mounted upon said creasing frame for folding in the end flaps of the envelop blank, and a fixed cam for operating said end-folding plates.

14. In a machine for making envelops, the combination with revoluble upper and lower gripping plates, means for rocking said gripping plates to bring them into parallelism, pivotally mounted frames coöperating with one of said gripping plates, and folding wing plates removably mounted on said frames whereby plates of different thicknesses may be mounted on the frames.

15. In a machine for making envelops the combination with a revoluble gripping plate of a revoluble creasing frame coöperating therewith, end folding plates pivotally mounted on said creasing frame, gear teeth carried by said frame, a rack bar meshing with said teeth, means for moving said rack bar as the frame revolves, and means for rocking said frame in its revolution.

16. In a machine for making envelops, the combination with upper and lower gripping plates, a creasing frame for simultaneously creasing the four sides of the envelop, end-folding plates, and a sealing plate, each revolving and operating successively upon the blank and means for rocking all of said parts in their revolution.

17. In a machine for making envelops, the combination with revoluble upper and lower gripping plates, a creasing frame, end-folding plates, a sealing plate, and fixed cams for operating said creasing frame, end-folding plates and sealing plate.

18. In a machine for making envelops the combination of revolving upper and lower gripping plates, means for rocking said plates and closing them in parallelism in their revolution, a sealing plate movable with one of said gripping plates, and means for operating said sealing plate.

19. In a machine for making envelops the combination of revolving upper and lower gripping plates, means for rocking said gripping plates in their revolution so as to bring them into parallelism, means for folding the end flaps and bottom flap of the blank, and means for finally folding the top flap against one gripping plate after the other gripping plate has been withdrawn.

20. In a machine for making envelops the combination of revolving upper and lower gripping plates, means for rocking said gripping plates in their revolution so as to bring them into parallelism, revolving forming mechanism coöperating with said gripping plates and including a sealing plate, a guide for receiving the formed envelop when released by said sealing plate, and a belt upon which the completed envelop is received.

21. In a machine for making envelops, the combination with a gripping plate, of a projection arranged near the edge thereof to space the gummed flap of the blank therefrom.

22. In a machine for making envelops, the combination with upper and lower revoluble gripping plates, one of which is provided with a projection at its edge for preventing said gripping plate from wiping the gummed surface of the blank.

23. In a machine for making envelops, the combination with rotary carriers, of frames removably mounted thereon, and gripping plates arranged upon and movable with respect to said frames, and a creasing frame coöperating with said gripping plates for simultaneously creasing the four sides of the envelop.

24. In a machine for making envelops, the combination with parallel shafts carrying removable frames, gripping plates mounted on said frames, forming mechanism coöperating with said gripping plates, said forming mechanism including a creasing frame which coöperates with the gripping plates to simultaneously crease the four sides of the envelop, and fixed cams for actuating said forming mechanism.

25. In a machine for making envelops the combination of two revoluble gripping plates, means for closing said gripping plates and bringing them into parallelism, a creasing frame embracing one of said gripping plates, and means for moving said creasing frame beyond the edge of the opposite gripping plate when said plates are closed.

26. In a machine for making envelops the combination of revoluble gripping plates, means for closing them in parallelism, a creasing frame embracing one of said gripping plates and movable beyond the edge of the companion plate to crease the blank, and folding mechanism coöperating with said creasing frame.

27. In a machine for making envelops the combination of revoluble gripping plates, means for closing them and maintaining parallelism therebetween, a creasing frame carried by one of said gripping plates and movable beyond the edge of the other one of said plates when closed, folding mechanism, and means for operating said folding mechanism after the gripping plates have released the blank.

28. In a machine for making envelops the combination of a series of revoluble gripping plates, means for rocking said plates to maintain parallelism and bring them to a closed position upon the blank, a rectangular creasing frame telescopically mounted with respect to one of said plates, means for moving said frame beyond the edge of the companion plate when said plates are closed, and folding mechanism coöperating with each creasing frame to fold the flaps on the creased blank.

29. In a machine for making envelops the combination of revolving gripping plates, means for maintaining said gripping plates parallel and in a closed position, a creasing frame coöperating with the blank when said plates are closed, and end folding wings movable with one of said gripping plates to fold the end flaps when the blank is released by the gripping plates.

30. In a machine for making envelops, the combination of two gripping plates movable in different paths, a creasing frame movable with one of said plates for simultaneously creasing all sides of the blank and end and side folding wings movable with one of said gripping plates to fold the flaps after the gripping plates have ceased to coöperate.

31. In a machine for making envelops, the combination of two gripping plates, one of which travels in an endless path, a creasing frame for simultaneously creasing all sides of the blank, and end folding wings movable with one of said gripping plates for folding the side flaps after the other gripping plate is withdrawn.

32. In a machine for making envelops, the combination of two gripping plates, one of which travels in an endless path, a creasing frame for simultaneously creasing all sides of the blank, and a side folding wing movable with one of said gripping plates for folding the end and side flaps after the other gripping plate is withdrawn.

33. In a machine for making envelops, the combination of two gripping plates, one of which travels in an endless path, said plates coöperating to grip the blank on all the marginal edges of the envelop, a creasing frame for simultaneously creasing all sides of the blank, and a side folding wing movable with one of said gripping plates for folding the side flap after the other gripping plate is withdrawn.

34. In a machine for making envelops, the combination of two gripping plates, one of which travels in an endless path, said gripping plates coöperating with each other to grip the blank on all four sides where it is to be creased, a creasing frame coöperating with said gripping plates to simultaneously crease all sides of the blank, and end folding wings movable with one of said gripping plates.

35. In a machine for making envelops, the combination of revoluble complementary mechanism including co-acting gripping plates for holding the blank at all of its sides at the time said blank is creased, means for creasing all four sides of the blank simultaneously and means for subsequently folding the flaps of the envelop.

36. In a machine for making envelops, the combination of gripping plates revolving about different centers, one of which gripping plates is yieldingly mounted, means for rocking said gripping plates so as to bring them into parallelism to hold the blank at all of its sides, a creasing frame coöperating with the blank to simultaneously crease all four sides thereof when said gripping plates are held parallel in gripping position on the blank, and means for operating said gripping plates.

37. In a machine for making envelops, the combination of gripping plates revolving about different centers and adapted to hold the blank at all sides, a creasing frame coöperating with said plates when in operative position on the blank to simultaneously crease all four sides thereof, of end folding plates pivotally mounted on said creasing frame, a bottom flap folding plate also mounted on said frame, and means for operating said folding plates.

38. In a machine for making envelops, the combination of gripping plates revolving about different centers and adapted to hold the blank at all sides, means for rocking said plates and closing them upon the blank in parallelism during their revolution, a creasing frame coöperating with said plates in their closed position to simultaneously crease all four sides of the blank, and a sealing plate movable with one of said gripping plates.

39. In a machine for making envelops, the combination of revoluble upper and lower gripping plates, means for rocking said gripping plates in their revolution so as to bring them into parallelism and to clamp the blank at all sides, means for simultaneously creasing all four flaps of the blank, means for folding the end flaps and bottom flaps of the blank, and means for finally folding the top flap against one gripping plate after the other gripping plate has been withdrawn.

40. In a machine for making envelops, the combination of two revoluble gripping plates, means for closing said gripping plates and bringing them into parallelism so as to hold the blank at all sides, a creasing frame embracing one of said gripping plates for coöperating with the blank when said blank is engaged by the other gripping plate and simultaneously creasing all four sides of the blank, and means for folding the flaps of the blank after the gripping plates are separated.

41. In a machine for making envelops, the combination of revoluble gripping plates, means for closing them into parallelism upon the blank, a creasing frame embracing one of the gripping plates and movable beyond the edge of the companion plate to crease the blank, and folding mechanism operating upon the flaps of the blank after the gripping plates have separated.

42. In a machine for making envelops the combination of a series of movable gripping plates, means for maintaining said plates in parallelism and causing said plates to close upon the blank, a creasing frame for each pair of gripping plates, and means for operating said creasing frame when said gripping plates are closed.

43. In a machine for making envelops the combination of a series of traveling gripping plates, means for maintaining said gripping plates in parallelism during a portion of their travel so that they will close upon the blank being formed, said means causing said plates to close upon the blank, creasing devices for operating upon the blank while it is gripped, and folding devices for operating upon said blank in its travel.

In testimony whereof I hereunto affix my signature in the presence of two witnesses, this 13th day of May, 1909.

ORPH W. COWGILL.

Witnesses:
ALMA GEBHART,
LENORE CLARK.